United States Patent [19]
Battati et al.

[11] Patent Number: 5,375,697
[45] Date of Patent: Dec. 27, 1994

[54] CONVEYOR CHAIN

[75] Inventors: Tienno Battati; Fabrizio Ferrari, both of Correggio, Italy

[73] Assignee: Marbett, S.p.A., Correggio, Italy

[21] Appl. No.: 56,414

[22] Filed: May 3, 1993

[30] Foreign Application Priority Data

May 7, 1992 [IT] Italy .................. RE92 U 000040

[51] Int. Cl.⁵ .............................................. B65G 17/06
[52] U.S. Cl. ...................................... 198/852; 198/853
[58] Field of Search ............................ 198/852, 853

[56] References Cited

U.S. PATENT DOCUMENTS

| | | | |
|---|---|---|---|
| 3,520,398 | 7/1970 | Thomson | 198/852 |
| 4,597,492 | 7/1986 | Lachonius et al. | 198/852 |
| 4,682,687 | 7/1987 | Leege et al. | 198/852 |
| 4,754,872 | 7/1988 | Damkjaer | 198/852 |
| 4,893,709 | 1/1990 | Schroeder et al. | 198/853 X |
| 5,096,050 | 3/1992 | Hodlewsky | 198/853 X |
| 5,156,264 | 10/1992 | Lapeyre | 198/852 |

FOREIGN PATENT DOCUMENTS 2564810 11/1985 France ................ 198/852

*Primary Examiner*—James R. Bidwell
*Attorney, Agent, or Firm*—Thomas R. Morrison

[57] ABSTRACT

Fork-shaped links on a conveyor chain allow the chain to follow sharp curves in a right angle to the plane of the links as well as allowing oscillation of adjacent links in the same plane as the links. Each link has a crosspiece and a pair of arms. A seat of articulation and oscillation having a central narrowing is positioned on the crosspiece. The crosspiece is inserted between the arms of an adjacent link, and a pin having a longitudinal flattening is inserted with the flattened portion facing the central narrowing, through holes in the arm, and through the seat.

2 Claims, 2 Drawing Sheets

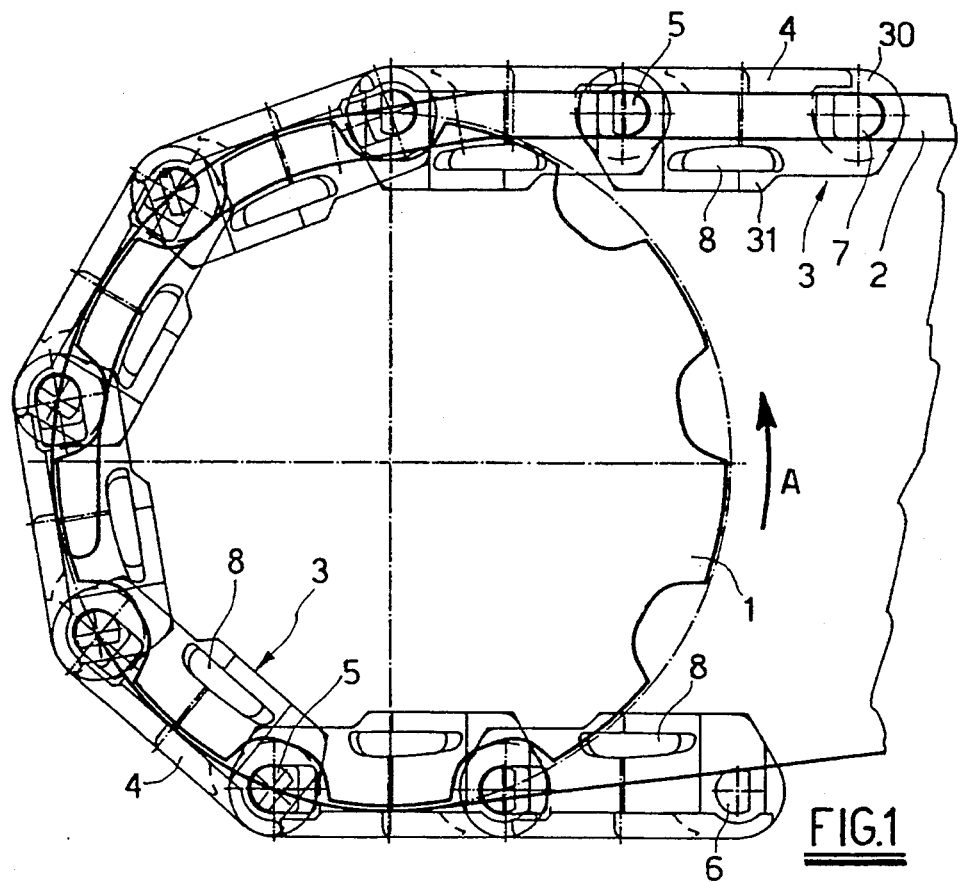
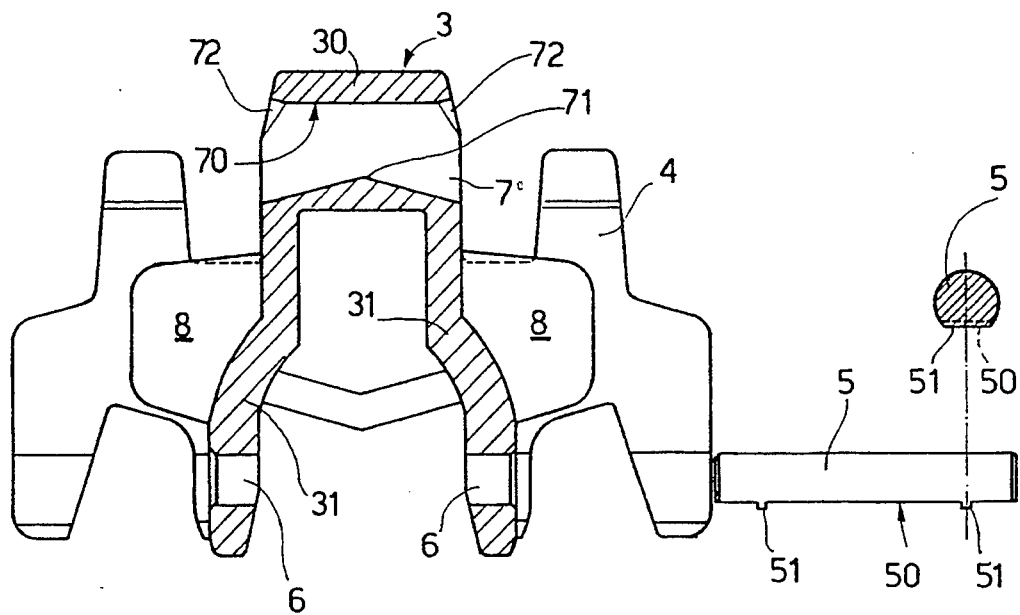

CONVEYOR CHAIN

This invention concerns a perfected conveyor chain.

In particular, the invention relates to those chains whose links can oscillate both at a fight angle to and parallel to their lying position, in such a way as to be able to close in a ring, creating at the same time curves in the plane of the links.

There are known conveyor chains, to which this present invention refers particularly, whose links are composed of a shaped element obtained by the molding of a synthetic material such as acetal resin.

The links of said known chains include a body which is in the shape of a fork and a monolithic plate which is used to close the aperture defined by said fork, from the part of the latter that defines the active zone or conveying zone of the link.

In particular, the crosspiece of said fork is shaped like a bush from whose end two divergent shaped arms derive.

The bush of the link of chain that follows is inserted between said two arms, and transversally to said arms there is a cylindrical pin which, crossing the bush, connects the two links.

Said cylindrical pin is inserted into a seat of articulation and oscillation that is formed in the bush of the link of chain that follows, and which is shaped, in right-angle section, like an eyelet whose lying plane is at a right angle to that of the link.

Thanks to said eyelet shape, the cylindrical pin can rotate in its seat, and also oscillate in the plane of the respective link.

However, said seat shaped like an eyelet requires that the size of the bush, in the sense of the axis of the link, be considerable, to allow a sufficient possibility of oscillation, between two adjacent links, in their plane.

Given that the bush creates the tooth of the link that is destined to engage with the drawing pinion of the chain, the capacity of the latter to follow curves that develop at a right angle to the plane of the link is strictly tied to said size of the bush.

Substantially, the smaller the tooth of the link, that is the aforementioned bush, the smaller is the radius of the curve that can be followed by the chain in the right angle plane to the link, but at the same time, the capacity of oscillation of two adjacent links in their plane is correspondingly limited.

In short, the presence of said seat shaped like an eyelet causes the known chains to present a certain difficulty in following curves that are relatively sharp or in the right angle plane to that of the links, or in the plane of the links themselves.

Nevertheless, in modem processing lines there is a great need for conveyor chains that are able to follow quite sharp curves that develop on both said planes, and this obviously in the full respect of their functionality.

Despite the many attempts made to resolve this problem, satisfactory levels have not yet been reached.

This is also in consideration of the fact that as the radius of the curve decreases, the risk of chain disengagement increases considerably, and the chain tends to come away from the relative pinion in particular when it is subject to heavy operating conditions.

The main objective of this present invention is to make available a conveyor chain that is able to comply with the need mentioned first, and to overcome the problem mentioned afterward.

Said objective is met by a chain such as that described in the enclosed claims.

Said chain presents a seat for insertion of the pin in the bush whose straight section is circular in the lower part (with reference to the forward direction of the chain), while said seat is created in the front part by two flat walls that converge at the center where they form a cusp, whose vertex determines a narrowing of said seat.

The pin inserted in said seat consists of a cylindrical rod with a longitudinal flattening facing the flat walls of the seat.

In addition, the distance that exists between the vertex of said cusp and the opposite wall of said seat is slightly greater than the diameter of said pin, in such a way as to allow the latter to rotate in its seat and to oscillate in correspondence with the vertex of said cusp.

The objectives of this present invention are reached thanks to the aforementioned means.

In fact, the particular configuration and arrangement of said pin and of the respective seat of articulation make it possible to substantially reduce the dimensions of the bush that constitutes the tooth of the link, without however compromising the mechanical characteristics.

Consequently, the chain can be wound on drawing pinions of relatively small diameter, then follow quite sharp curves (right angle to the lying plane of the link), which is difficult to obtain with the conveyor chains that conform to the known technique described in the introduction.

Finally, in compliance with the advantageous nature of this present invention, the outer sides of the arms of the fork-shaped body include protruding retaining elements whose function, in combination with special guides, is to maintain the engagement between links and pinion when the chain follows sharp curves (fight angle to the lying plane of the links) and is subject to heavy operating conditions.

The characteristics and constructive advantages of this present invention become evident from the detailed description that follows herein, with reference made to the figures enclosed:

FIG. 1 is a side view of a curved tract of a conveyor chain as per this present invention;

FIG. 4 is the IV—IV section marked in FIG. 3, on a smaller scale, and in the right part of this drawing there is a longitudinal view and a transverse view in section of the pin for articulation between the links;

Figure 2:
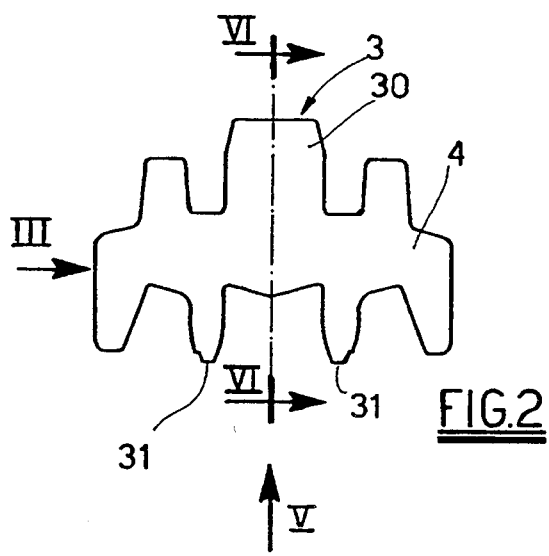
FIG. 2 shows a link of the chain according to a plan view from the part of the active zone or conveying of the chain.

From said figures, see in particular FIG. 1, there is a drawing pinion 1 with horizontal axis for drawing a conveyor chain as per this present invention.

The pinion 1 is commanded to rotate in the direction shown by A, and this same pinion 1 presents, in the specific case, nine teeth.

In addition, two lateral guides 2 opposite one another are associated to the tract of advancement of the chain, of which only one is visible in FIG. 1, and said guides also follow the curving of the pinion 1 substantially for a fourth of the round angle. We will return to said guides 2 further on.

As illustrated in FIG. 4, each individual link includes a basic body 3 in the shape of a fork, and the aperture of said fork is partially closed by a monolithic shaped plate 4.

Said plate 4 defines the active surface of the conveyor chain, and has an elongated form situated transversally to the axis of symmetry of said fork.

In addition, the front and rear edges of said plate 4 have respective toothing that is reciprocally staggered, which is used to stabilize the continuity of the active surface of the chain, in collaboration with the identical teeth of the adjacent links, even when the chain follows curves (not illustrated) contained in the lying plane of the links.

In compliance with this present invention, the crosspiece of said fork consists of a bush 30 that is destined to be inserted between the arms 31 of the fork of the subsequent link.

Said bush 30 is joined to the outer face of plate 4 (see FIG. 6), and said bush 30 forms the tooth of the link that is destined to be inserted in the openings of pinion 1 (see FIG. 1).

The reciprocal connection between each pair of links is made by a transverse pin 5 that is illustrated in the right part of FIG. 4. Said pin 5 consists of a cylindrical rod that has a longitudinal flattening 50 from which rise two small transverse end ribbings 51 that are opposite one another.

In particular, said flattening 50 subtends an angle of approximately 115°, and the sides of said ribbings 51 are appropriately bevelled.

The terminal parts of pin 5 are blocked in respective coaxial openings 6 that are made on the free ends of the arms 31 of one link of said pair, while the central portion of said pin 5 is inserted into a seat 7 of articulation and oscillation that is made in the bush 30 of the other link of said pair.

Figure 3:
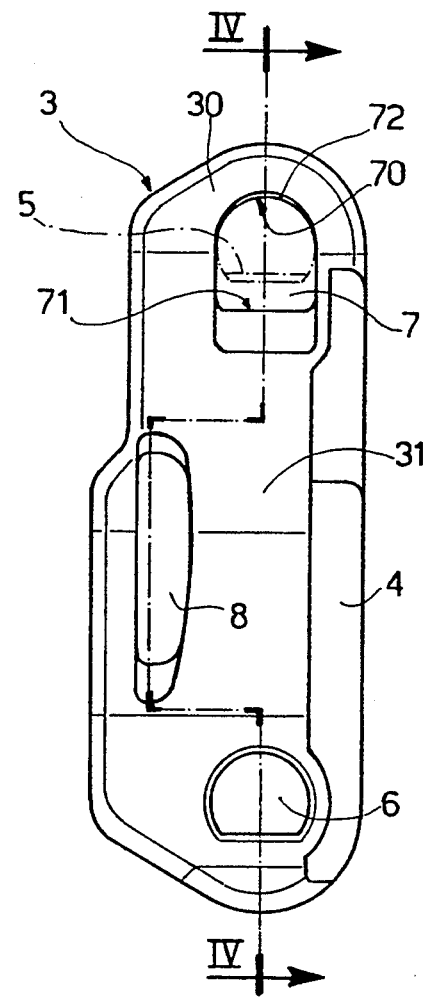
FIG. 3 is the view obtained according to the direction III as per FIG. 2, in enlarged scale.

In particular, the transverse section of said openings 6 is practically equal to the right angle section of pin 5, excluding the ribbings 51 (FIGS. 3, 4).

In addition, the length of pin 5 is slightly less than the maximum distance between the outer sides of the arms 31, and the distance between the outer sides of the two ribbings 51 is substantially equal to the distance between the inner sides of said arms.

Thanks to the elements described above, pin 5 is blocked both torsionally and axially with respect to the arms 31, with the flattening 50 orientated toward the free ends of the latter.

In addition, better seen in FIGS. 3 and 4, for the forced insertion of pin 5 in said openings 6, the outer mouths of said openings are appropriately bevelled.

Figure 6:
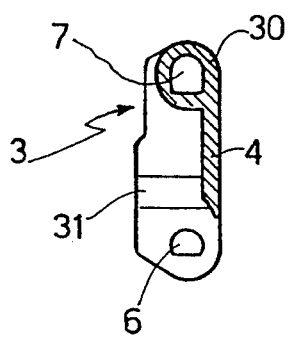
FIG. 6 is the VI—VI section marked in FIG. 2.

As concerns said seat 7 of articulation, well illustrated in FIGS. 3, 4, and 6, said seat presents a shaped form, like a slot with a narrowing in the center. Said slot is contained in a plane that is parallel to the lying plane of the link, and that also contains the common axis of said pair of openings 6. The width of the slit is practically equal to the diameter of pin 5.

In addition, the terminal walls of said seat 7 that are turned respectively toward the cylindrical and flat parts 50 of pin 5 are shaped, respectively, like a semi-cylindrical surface 70 (FIGS. 3, 6) and like a symmetrical cusp 71 (FIG. 4).

In particular, said cusp 71 is defined by two inclined planes arranged according to a very open "V", whose opening is turned toward the arms 31 (FIG. 4).

In addition, the distance that exists between the median generating line of said semi-cylindrical surface 70 and the vertex of said cusp 71 is slightly greater than the diameter of pin 5. The reason for this is to prevent interference when the chain goes into a curve as is easy to understand from FIG. 1.

In addition, the distance just defined also has the function, in combination with the bevellings 72 and the cusp 71, of allowing the links to follow curves contained in their lying planes.

This has not been illustrated in that it is easily understood from the preceding description and from an examination of the enclosed figures.

Figure 5:
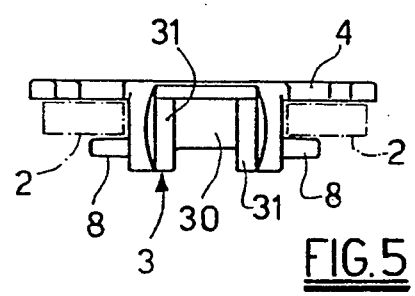
FIG. 5 is the view obtained according to the direction V marked in FIG. 2.

Finally, on the outer sides of said arms 31, there are two appendices or fins 8 for maintaining the mesh and guiding that are substantially parallel to plate 4 (see FIGS. 1, 3, 5).

Said fins 8 are situated on the part of the arms 31 that is opposite to that occupied by plate 4, and said fins 8 are located between the seat 7 and the openings 6 (FIGS. 1, 3).

In particular, said fins 8 are shaped like a wing profile. More precisely, each fin 8:

has a trapezoidal shape with radiused corners according to a plan view (FIG. 4), has a flat face turned to the outside of the link (FIGS. 1, 3, 5), has the opposite face that is rounded in the direction of movement (FIGS. 1, 3), has a thickness that decreases both in the direction that goes from the attached end and toward the free end, and in the direction that goes from the edge facing seat 7 and toward the opposite edge (FIGS. 1, 3), and said two edges are radiused (FIGS. 1, 3).

The functions of said appendices or fins 8 is thus evident from FIGS. 1 and 5.

The value and advantages of this present invention are clearly comprehensible from the preceding description and from the enclosed figures.

We claim:

1. A conveyor chain comprising:

means for following curves that are particularly sharp that develop both in a conveyor plane and at a right angle to said conveyor plane;

multiple links that are shaped like a fork, each of said links having a crosspiece and a pair of arms extending therefrom;

an aperture between said pair of arms is closed from the active part of the link by a monolithic plate;

said links are connected by pins situated transversely to said arms of said links, and that are inserted into respective seats of articulation and oscillation situated on said crosspiece of said link;

said pin presents a partially cylindrical shape;

said seat presents a central narrowing that faces a non-cylindrical part of said pin;

said pin is torsionally and axially blocked with respect to free ends of said arms of said fork, where said torsional block is made by two paired openings situated on said tree ends, and where said axial block is made by two ribbings that are located transversely to said flattening, and each of said two ribbings are supported against a respective inner side of each of said arms.

2. A chain for conveyor systems comprising:

links whose body are fork-shaped;

a shaped monolithic plate which partially closes apertures of said forks;

a means for connecting said links such that they are situated transversely to arms of said forks and are inserted into seats of articulation and oscillation, said seats being situated on crosspieces of said forks;

said means for connecting present a partially cylindrical shape;

said seats each present a central narrowing;

means for preventing torsional and axial movement of said connecting means;

said means for connecting are cylindrical rods having a longitudinal flattening;

said means for preventing torsional movement are two paired openings situated on said arms of said forks; and said means for preventing axial movement is accomplished by two ribbings that are located on said flattening and are supported against said arms inner sides.

* * * * *